US011105668B2

(12) United States Patent
Hammill et al.

(10) Patent No.: US 11,105,668 B2
(45) Date of Patent: Aug. 31, 2021

(54) SMART MEASUREMENT SYSTEM

(71) Applicant: Sensia LLC, Houston, TX (US)

(72) Inventors: Donald R. Hammill, Calgary (CA);
Thomas Madden, Duncan, OK (US);
Thomas Neilson, Duncan, OK (US)

(73) Assignee: SENSIA LLC, Houston, TX (US)

( * ) Notice: Subject to any disclaimer, the term of this patent is extended or adjusted under 35 U.S.C. 154(b) by 0 days.

(21) Appl. No.: 16/805,380

(22) Filed: Feb. 28, 2020

(65) Prior Publication Data

US 2020/0200581 A1  Jun. 25, 2020

Related U.S. Application Data

(63) Continuation-in-part of application No. 14/028,988, filed on Sep. 17, 2013.

(51) Int. Cl.
| G08B 23/00 | (2006.01) |
| G01F 1/76  | (2006.01) |
| G01F 1/40  | (2006.01) |

(52) U.S. Cl.
CPC . *G01F 1/76* (2013.01); *G01F 1/40* (2013.01)

(58) Field of Classification Search
CPC ..................................... G01F 1/76; G01F 1/40
USPC ...................................................... 340/870.02
See application file for complete search history.

(56) References Cited

U.S. PATENT DOCUMENTS

| 6,267,291 | B1  | 7/2001  | Blankenship et al. |
| 9,038,887 | B1* | 5/2015  | O'Hanlon ............. G06Q 20/02 |
|           |     |         | 235/375 |
| 2004/0167735 | A1  | 8/2004 | Rothman et al. |
| 2006/0056370 | A1* | 3/2006 | Hancock ................ H04L 1/203 |
|              |     |        | 370/338 |
| 2006/0235488 | A1* | 10/2006 | Nycz ..................... A61B 90/90 |
|              |     |         | 607/60 |
| 2007/0029388 | A1  | 2/2007 | Liu |
| 2007/0193334 | A1* | 8/2007 | Hays .................... G01F 1/8436 |
|              |     |        | 73/1.34 |
| 2008/0011821 | A1  | 1/2008 | Ellender et al. |
| 2008/0088464 | A1* | 4/2008 | Gutierrez ............. G01F 15/063 |
|              |     |        | 340/606 |
| 2008/0296208 | A1  | 12/2008 | Ikeyama et al. |
| 2009/0150096 | A1  | 6/2009  | Brown et al. |

(Continued)

FOREIGN PATENT DOCUMENTS

| JP | 2008-015855 A | 1/2008 |
| KR | 10-2005-0118748 A | 12/2005 |
| KR | 10-2007-0076786 A | 7/2007 |

OTHER PUBLICATIONS

International Search Report and Written Opinion on PCT/US2014/055938 dated Dec. 22, 2014. 10 pages.

(Continued)

*Primary Examiner* — Naomi J Small
(74) *Attorney, Agent, or Firm* — Foley & Lardner LLP (57) ABSTRACT

A system and method are presented for collecting and retrieving characterization data of measurement devices, such as flow meters. The system includes a meter, a data tag for storing the meter characterization data, and electronics, such as a totalizer and/or a reader device such as a portable reader to read the characterization data from the tag and calibrate the meter measurements using the characterization data.

20 Claims, 4 Drawing Sheets

(56) References Cited

U.S. PATENT DOCUMENTS

| | | | |
|---|---|---|---|
| 2010/0262380 A1* | 10/2010 | Matievich, Jr. | G01N 33/48 |
| | | | 702/22 |
| 2011/0004764 A1 | 1/2011 | Stuber | |
| 2011/0154911 A1 | 6/2011 | Ge | |
| 2013/0306183 A1* | 11/2013 | Sawchuk | G01F 15/00 |
| | | | 138/44 |
| 2014/0027000 A1* | 1/2014 | Kiest, Jr. | F16L 55/265 |
| | | | 138/97 |
| 2014/0041436 A1* | 2/2014 | Knott | G01N 33/0008 |
| | | | 73/1.06 |
| 2014/0060161 A1* | 3/2014 | Schick | G01N 27/10 |
| | | | 73/53.01 |
| 2014/0111342 A1* | 4/2014 | Ramsay | G01F 1/662 |
| | | | 340/606 |
| 2014/0238148 A1 | 8/2014 | Priyadarshana et al. | |

OTHER PUBLICATIONS

CA Office Action other than Search Report on CA Appl. Ser. No. 2922764 dated Oct. 21, 2020 (4 pages).

International Preliminary Report on Patentability on PCT Appl. Ser. No. PCT/US2014/055938 dated Mar. 22, 2016 (6 pages).

\* cited by examiner

SMART MEASUREMENT SYSTEM

CROSS-REFERENCE TO RELATED APPLICATIONS

This application claims priority to, and is a continuation-in-part of U.S. patent application Ser. No. 14/028,988, entitled "SMART MEASUREMENT SYSTEM," filed on Sep. 17, 2013, the contents of which are hereby incorporated herein by reference in their entirety for any purpose.

BACKGROUND

Oil and natural gas are recognized as valued commodities. These fluids that may include comingled by-products are produced from wells that tap specific subterranean geologic formations. Quantitative measurement of the amounts of all fluids drawn from or placed in the geologic formation is valuable information toward the development and management of the resource. After the fluids and their byproducts are brought to the surface until the fluids are consumed or by-products are disposed of, the fluids undergo many processes to purify them. Once suitable for market these fluids are transported and commercially traded. To properly manage and account for these fluids, repetitive quantitative measurements are often made as the fluids undergo various stages of purification, transportation, storage, and trade all prior to consumption.

Many types of flow meters exist to accommodate a variety of fluid characteristics and flowing conditions. For example, there may be different flow meter types/models for different flow tube line sizes, tube materials, rates of flow, pressure ratings, temperature ratings, and accuracy ratings, etc. These varieties of flow meter types also vary as some meters express flow quantities in terms of units of mass while other types express units of volume. The meter's principle of operation may result in an initial measurement of the rate of flow or discrete increments of quantity.

One such type of flowmeter is a turbine type which possesses an element that is in contact with the fluid. It rotates at a variable speed that is proportional to the volume rate of fluid flow. Certain types of turbine flow meters are designed to output one or more electrical pulses for each discrete increment in volume. The number of pulses per unit of volume is referred to as a K-factor. These pulses are captured by a separate electronic device that considers the increment of time and the K-factor. The computed values of either or both flow total and flow rate are communicated visually and in various electrical or electronic formats. This separate electronic device will subsequently be referred to as the meter electronics.

The meter calibration K-factor values can by derived from measurements under test conditions, such as at the factory. Each individual flow meter may have multiple unique characteristics that the meter electronics must account for to achieve optimum measurement performance. For example, the response curve for a flow meter may not be linear over the entire operating range. Therefore, a flow meter may have multiple K-factors, each at a different rate of flow. In another example, some flow meter types can require special compensation algorithms or be calibrated across a range of fluids or operating conditions.

Another type of flow meter is a cone meter that uses a discharge coefficient with respect to a flow parameter referred to as a Reynolds number. Cone meters are flow tested and shipped with the Reynolds number performance information that is then later entered into a flow computer similar to the K-factor values for other meters.

Normally, it is difficult or tedious to enter multiple K-factors or other characterization factors for flow meters into the meter electronics. Manually entering multiple characterization points can lead to errors in data. Further, only a limited amount of data can be entered. Not having information on a flow meter's characteristics and operating range can lead to less accuracy in flow measurements.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Some embodiments relate to a measurement system including a meter associated with meter characterization data (or characterized by meter characterization data) and configured to take meter measurements. The measurement system includes a radio frequency identification (RFID) data tag configure to store the meter characterization data, and meter electronics in communication with the meter and including a communication interface in wireless communication with the RFID tag; and configured to receive the meter characterization data. The meter characterization data is readable by the meter electronics and useable by the meter electronics in processing the meter measurements.

Some embodiments relate to a method of measuring. The method includes calibrating a meter and obtaining characterization data from the meter, digitally storing the characterization data for the meter in a data tag; attaching the data tag to the meter, receiving measurements from the meter and the characterization data for the meter from a reader configured to read the data tag, and processing the received measurements from the meter and calibrating the measurements using the characterization data.

Some embodiments relate to a meter for use with a data tag configured to be attached to the meter and store characterization data for the meter, the meter includes a processor configured to receive the meter measurement data from the meter and the characterization data for the meter from the data tag and to process the received meter measurement data from the meter and calibrate the meter using the characterization data.

Figure 1:
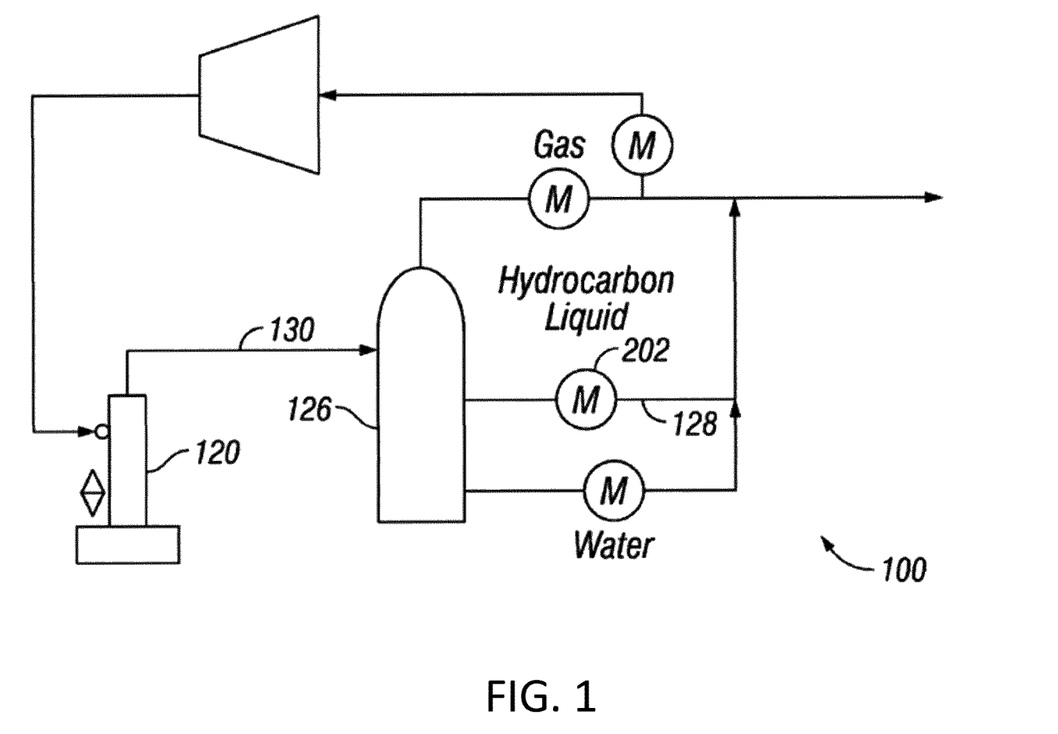
FIG. 1 is an illustrative working environment wherein the smart flow meter device could operate.

To further assist the reader's understanding of the disclosed systems and methods, an environment for their use and operation is described. For example, an illustrative resource extraction system 100 is shown in FIG. 1, which may include a well 120 and separator 126. A measurement system 202 is attached to a flowline 128 that is a fluid connection with a connector 130 and the separator 126. As illustrated the resource extraction system 100 may be configured and used to measure hydrocarbons (e.g., oil and/or natural gas) and optionally water through the addition or repurposing of measurement system 202. When assembled, the separator 126 may couple to the well 120 and include a variety of valves, fittings, and controls for operating the separator 126 to produce the well 120. As explained below, the flow measurement system 202 may be configured to measure the flow of a fluid through the flowline 128. However, it should also be appreciated that one or more measurement systems 202 may be used in any of the flowlines of the resource extraction system 100, including the gas and water flowlines.

Figure 2:
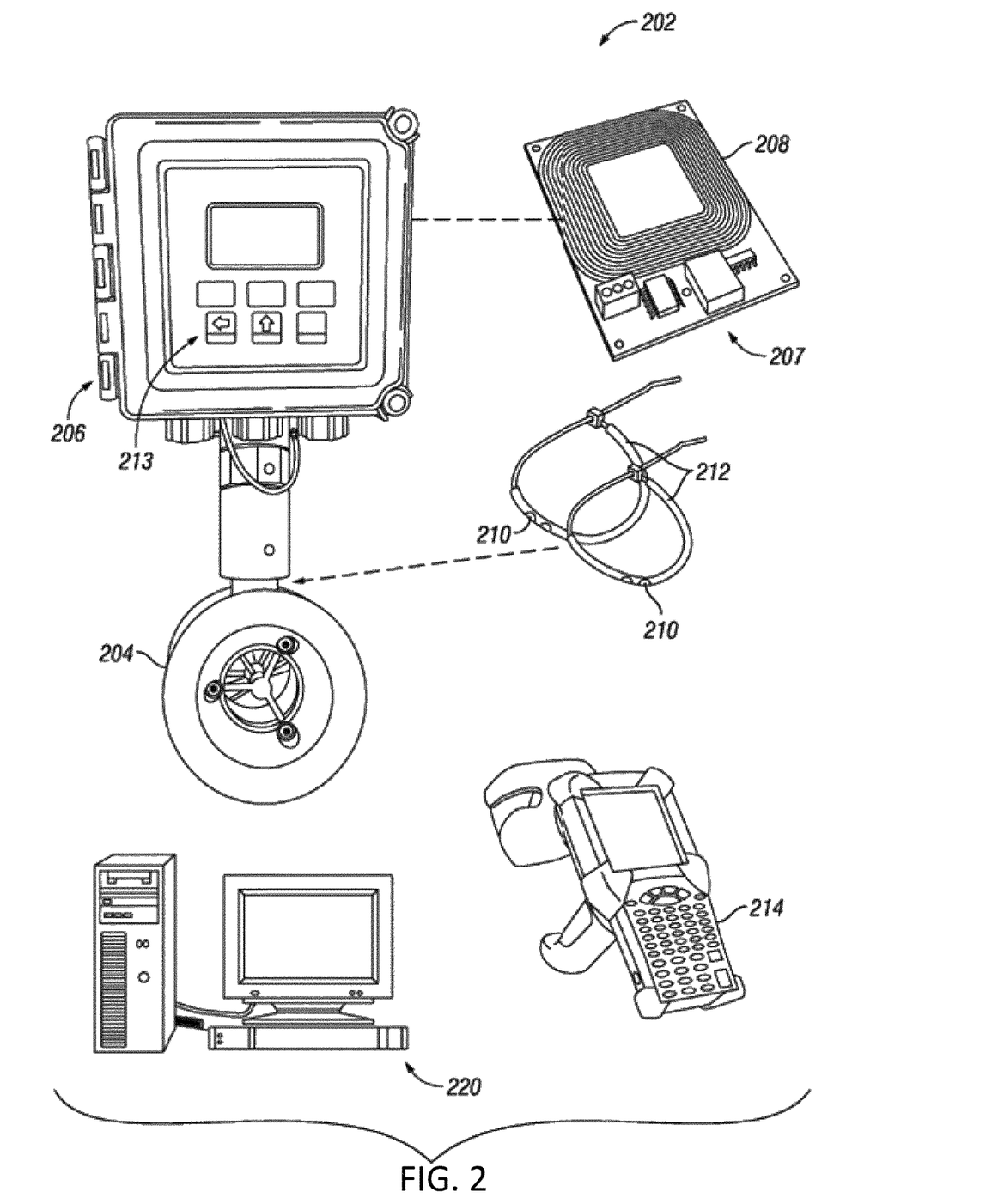
FIG. 2 is an illustrative embodiment of a flow meter device, an embedded chip, and a portable reader.

FIG. 2 shows an illustrative embodiment of a measurement system 202. The measurement system 202 can include a measurement device/meter 204, such as a flow meter to measure units of fluid passing through the meter 204, and meter electronics 206. Although not shown, the measurement system 202 may also include a power source.

The meter 204 may be characterizable by one or multiple K-factors over its operating range. For the example of a flow meter 204 with multiple K-factors, the meter performance could be represented by K-factor values at specified meter output pulse frequencies that originated for test data or it could be represented by mathematical coefficients that would create a curve that could approximate the multiple K-factor sets. The K-factor(s) can account for variations in flow meter dimensions, surface finish, bearing drag, magnetic drag, or other tolerance variations occurring during manufacture. The K-factor(s) can represent the various number of pulses per unit of volume at various frequencies of the flow meter 204 as measured with a gas or as measured with a liquid. The K-factor may be in units of frequency or in units of time (i.e., a wave period) or any other derivative or origin data that can be used to derive the equivalent of a K-factor like meter response versus flow reference. Other meter calibration values can quantify the flow effect of fluid density or viscosity.

Other meter calibration values are contemplated and are included within the scope of the invention and claims, e.g., Reynolds number. It should be noted that the meter 204 being a flow meter is used for the purpose of description of this embodiment. However, any type of sensor could be used in conjunction with the measurement system 202.

The meter 204 measurements are communicated to the meter electronics 206 to be converted to data. As an example, the meter electronics 206 may include a totalizer for converting the meter 204 measurements to data and then processing, storing, or also possibly displaying the measurement data. It should be appreciated though that the meter electronics 206 may be any type of electronics for receiving measurements from the meter 204, such as but not limited to other types of flow computers. The measurement data may also be processed and then output to another device for further analysis. As shown, the meter electronics 206 may include an electronics board 208 that includes, for example, a central processing unit such as a microchip with a processor and any manner of integral or independent electronic storage medium. The microchip may calculate, for example, fluid flow from data received through the meter 204. The electronics board 208 microchip also has the capability of loading the K-factor data for the meter 204 into a K-factor data table such as a database stored on the storage medium. Also included in the meter electronics 206 is a communication interface 207 described further below. Optionally, the meter electronics 206 may further include a visual indicator that the meter 204 was operated under a condition outside of its specified operating range. The actual condition data may be recorded and displayed on the electronics 206.

The measurement system 202 may also include one or more data tags, 210, such as a passive or active RFID tag, QR code, barcode, and/or the like. Data regarding the calibration, or K-factor, data for the meter 204 is stored on the data tag 210. Other data for the meter 204, such as meter type, may also be stored on the data tag 210. For example, this other data meter type data could at least include:
a. minimum-rated flow capacity;
b. maximum-rated flow capacity;
c. minimum pulse amplitude or pulse amplitudes at various frequencies;
d. model number;
e. serial number;
f. assigned user tag number;
g. materials of construction;
h. agency certifications; and
i. date of manufacture or calibration.

In various embodiments, the data tag may correspond to different data when read by different devices. For example, a data tag comprising a QR code may be configured to correspond to instructions, promotional messages, and/or links to websites upon scanning by a generic QR code scanning device (e.g., a "first reader"), whereas the same QR code may correspond to meter characterization data if scanned by a reader associated with the meter electronics 206 or a portable reader 214. In some embodiments, the QR code comprises a dual purpose QR code corresponding to a first set of data when scanned by a first reader and a second set of data when scanned by the portable device.

The K-factor data may be loaded onto the data tag 210 by the manufacturer of the meter 204 or by any person or entity having calibrated the meter 204. The data tag 210 may be attached to the meter 204 in any suitable form. As shown, the data tag 210 is included in a band 212 connected with a portion of the exterior of the meter 204 as shown by the dotted arrow. In further instances, the data tag 210 is provided separately from the band 212, and the band 212 is an adhesive pad, zip tie, hose clamp, cable or other device operable to affix the data tag 210 to a structure. The band 212 and/or the data tag 210 may also include an identification reference that matches an identification reference on the meter 204 to ensure quality control in matching the data tag 210 to the correct meter 204. The identification reference may be visual or may be stored as data readable by a device, such as a portable RFID reader, portable QR code reader, portable barcode reader, and/or the like.

The data tag 210 is in communication with the meter electronics 206 through the communication interface 207, such as a QR code reader and/or an RFID reader. The communication interface 207 may be a part of the meter electronics 206 or may be in operative communication with the meter electronics 206. In various instances, the data tag 210 is in communication with the meter electronics 206 through the communication interface 207. The communication interface 207 may be a logical aspect of both the meter electronics 206 and a reader device, such as a portable reader. Thus, the communication interface 207 may be said to be a portion of a portable reader. In various embodiments, the portable reader is a camera phone with a QR code reader software application. This portable reader may be in logical communication with, or may be a logical aspect of the meter electronics 206. For example, the portable reader may be connected via an interconnection of a communication device of the portable reader with a communication device of the meter 204. In various embodiments, the meter electronics 206 includes its own communication interface 207 which communicates directly with the QR code. For instance, the communication interface 207 may also include a QR code reader that is a dedicated component of the meter electronics 206.

Being in communication enables the meter electronics 206 to synchronize with the data tag 210 and wirelessly load the K-factor data for the meter 204 from the data tag 210. The K-factor data for the meter 204 can thus be communicated to the meter electronics 206 and used by the electronics 206 to calibrate the meter 204 measurements and properly calculate the measurement data. For example, a QR code reader such as a camera phone running an QR code reading application may transmit the K-factor data to the meter electronics 206. This transmission may be effectuated via a wireless connection between the camera phone running a QR code reading application and the meter electronics 206. Such wireless connection may include at least one of Bluetooth, NFC, or any other communication technology. Other data regarding the meter 204, such as the type of meter and the meter operational range, may also be communicated from the data tag 210 to the meter electronics 206, such as via a RFID reader, QR code reader (e.g., camera phone with a QR code reading application), and/or the like. The communication interface 207 can be configured to communicate with the data tag 210 for the meter 204 as well as, in various embodiments, data tags on other flow meters, and can also be used to communicate with other measurement systems. Alternatively, the communication interface 207 can receive the meter calibration values from a remote terminal or device.

The data on the data tag 210 may also be synchronized with other electronics than the meter electronics 206. As described above, the meter 204 and data tag 210 can be labeled with identification references. A portable data reader/writer 214 (such as a RFID reader, QR code reader, camera phone running a QR code reading device, etc.) may then be used to read and store the identification reference in a database. A quality control service could later use the portable reader 214 to confirm that the data tag 210 is on the correct meter 204. Additionally, data tag 210 information read by the portable reader may also be capable of sending data read from the data tag 210 to a logging facility 220, which may be remote from the meter 204 and meter electronics 206. The logging facility 220 may also receive data from other meters 204.

As an advantage, the measurement system 202 can remotely read the meter calibration values, such as obtaining the meter calibration values from the meter 204 through the communication interface 207. The values can be read wirelessly, for example, over radio-frequency electromagnetic fields, via images from an optical camera, or the like. The values can also be read at any time. Alternatively, the meter calibration values can be directly entered into the measurement system 202 by a user through the user interface 213. In another alternative, the meter calibration values can be obtained from other remote devices, such as the portable reader 214 through the communication interface 207. In various embodiments, the portable reader 214 takes an image of the data tag 210 and, via a software application, decodes data represented by a visual pattern, such as a QR code. The portable reader 214 prepares meter calibration data based on the decoding, and transmits, the meter calibration data to the meter 204, such as through a communication interface 207. Communication interface 207 may receive the meter calibration data, which may be transmitted via Bluetooth, NFC, wireless, sonic, optical, or any technology as desired.

The meter calibration values are used in operation by the flow meter electronics of the flow meter 202 to calibrate a flow measurement. The meter calibration values are typically obtained by measurement at the factory, under test conditions and are commonly stored in the meter electronics before the flow meter is shipped from the factory. In addition, the meter calibration values can be programmed or re-programmed into the meter electronics by a user in the field during equipment service sessions. Moreover, the meter calibration data may be represented by a printed QR code that is provided with the meter and implemented in systems and methods discussed herein for the loading of corresponding data into the meter electronics by a user in the field. As an advantage, if the meter 204 is re-configured, or repaired, the new calibration values can be re-programmed to the meter electronics 206 so that the meter 204 can still be identified. This programming is typically facilitated by the data tag 210 attached to the meter 204, with the re-configured data written to the tag 210 or by an additional tag 210 that would be supplied with the replacement or retested flow meter parts. Therefore, the user can re-program the meter electronics 206 with correct calibration information if required, such as in the event of power loss, memory loss, re-configuration, etc., of the meter 204.

As an alternative, other communication interfaces can be used. The communication interface 207 can comprise any type of communication device. In one embodiment the communication interface 207 comprises a modem, network card, etc., configured to communicate over a network. The communication interface 207 comprises a wireless communication device, such as a radio or optical receiver or transceiver, for example.

Figure 3:
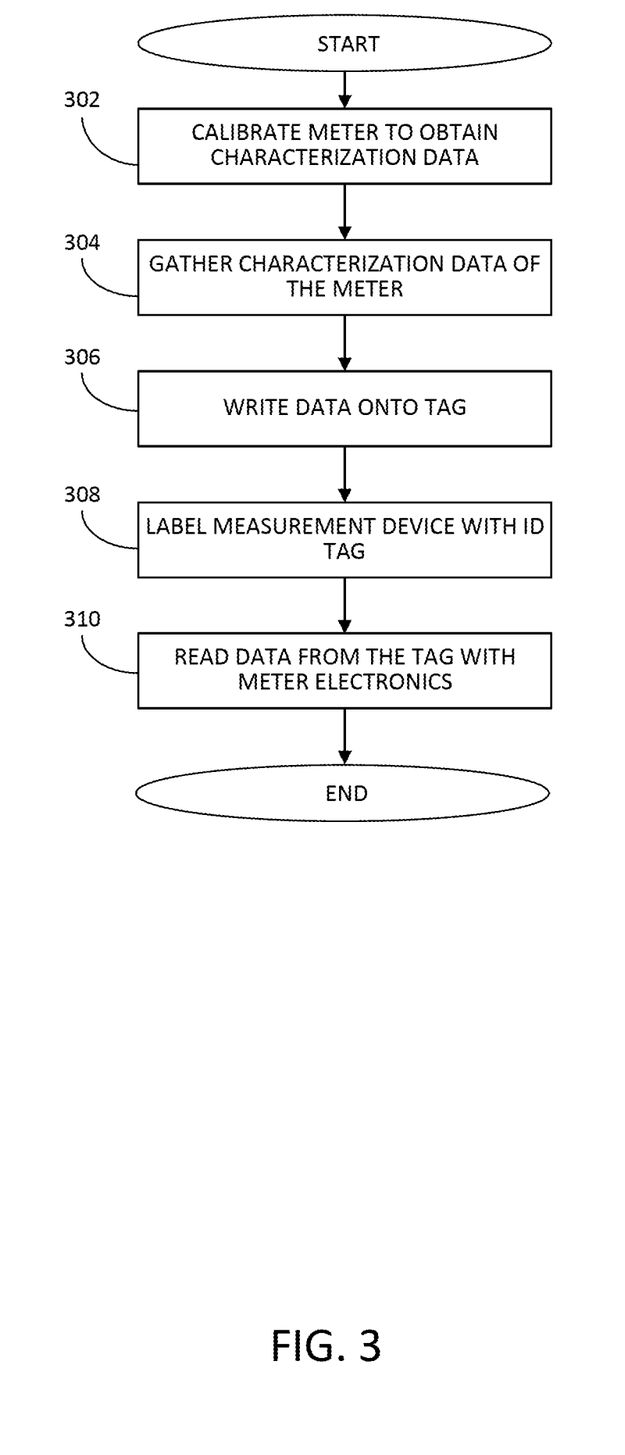
FIGS. 3 and 4 are illustrative charts that display example methods for characterizing data for the flow meter device in accordance with one or more embodiments.
Figure 4:
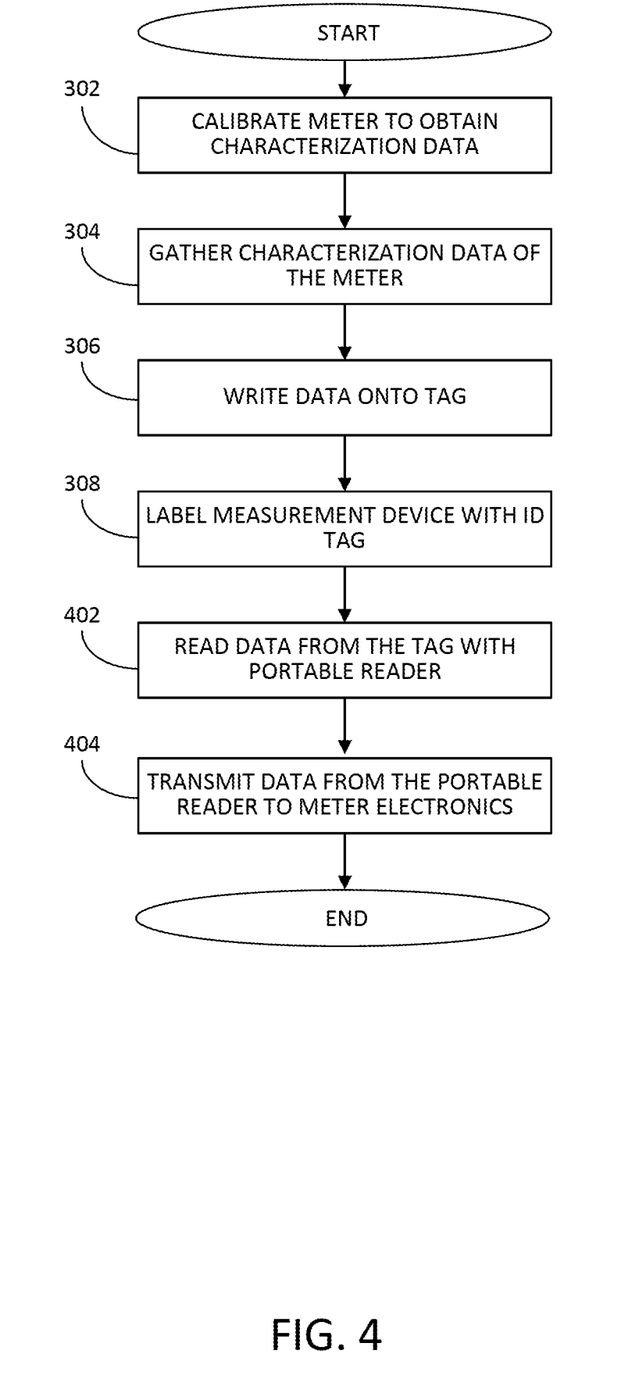

FIG. 3 illustrates example methods for the use of the measurement system in accordance with one or more embodiments. The illustrative flow diagram shows an example method for entering and retrieving characterization data from a measurement device, such as a flow meter. In block 302, the measurement device is calibrated at the factory or lab to determine the characterization data for the device before being sent to the customer or distribution. As explained above, the measurement device can be of any type. In block 304, the characterization data is collected. For example, the meter characterization data may include K-factors for flow over a specified range. The characterization data is written onto a data tag such as a RFID tag, as shown in block 306. The data tag such as the RFID tag is attached to the measurement device, as shown in block 308. The ID tag can also include any other information about the measurement device. The characterization information stored on the data tag such as the RFID tag is read by the meter electronics at 310 to enable the meter electronics to process the measurement information from the meter. FIG. 4 illustrates further example methods for the use of the measurement system in accordance with one or more embodiments. The illustrative flow diagram shows an example method for entering and retrieving characterization data from a measurement device, such as a flow meter. In block 302, the measurement device is calibrated at the factory or lab to determine the characterization data for the device before being sent to the customer or distribution. As explained above, the measurement device can be of any type. In block 304, the characterization data is collected. For example, the meter characterization data may include K-factors for flow over a specified range. The characterization data is written onto a data tag, such as a QR code tag, as shown in block 306. The data tag such as the QR code tag is attached to the measurement device, as shown in block 308. The data tag can also include any other information about the measurement device. The characterization information stored on the data tag is read by a portable reader, such as a camera phone running a QR code reader application at 402. In various embodiments, the QR code reader application is a logical component of the meter electronics. The portable reader decodes the data represented by the QR code and transmits the data to the meter electronics 310 at 404 to enable the meter electronics to process the measurement information from the meter. The meter includes a processor or electronics configured to receive the meter measurement data and the characterization data for the meter from the data tag and to process the received meter measurement data from the meter and calibrate the meter using the characterization data.

Although the present invention has been described with respect to specific details, it is not intended that such details should be regarded as limitations on the scope of the invention, except to the extent that they are included in the accompanying claims.

What is claimed is:

1. A measurement system for monitoring flow, the measurement system comprising:
    a meter associated with meter characterization data and configured to obtain measurements of the flow;
    a data tag coupled to the meter and comprising an optically-scanned code, the data tag configured to store the meter characterization data;
    meter electronics comprising a processing circuit configured to receive the meter characterization data, the meter characterization data useable by the meter electronics in processing the measurements of the flow; and
    a portable device configured to read the optically-scanned code and transmit the meter characterization data to the meter electronics.

2. The system of claim 1 wherein the meter is characterizable over an operating range by at least one or more data sets of different K-factors at corresponding different Reynolds numbers.

3. The system of claim 1, wherein the meter comprises a flow meter and the meter electronics comprise a totalizer.

4. The system of claim 1,
    wherein the meter electronics receives the meter characterization data from the data tag via the portable device,
    wherein the portable device reads the data tag to retrieve the meter characterization data,
    wherein the portable device transmits the meter characterization data to the meter electronics.

5. The system of claim 1, wherein the optically-scanned code comprises a dual purpose QR code corresponding to a first set of data when scanned by a first reader and a second set of data when scanned by the portable device.

6. The system of claim 1,
    wherein the meter electronics receives the meter characterization data from the data tag via the portable device comprising an RFID tag reader, and
    wherein the data tag comprises an RFID tag that can accept data from the portable device.

7. The system of claim 4, wherein the portable device is capable of loading the meter characterization data into a database.

8. The system of claim 1, wherein the meter and the data tag each further comprise matching identification references.

9. The system of claim 1, wherein the meter comprises an operating parameter and the meter electronics further include an indicator to indicate that the meter has operated outside of the operating parameter.

10. The system of claim 1, wherein the optically-scanned code comprises a quick response (QR) code.

11. A method for measuring flow, the method comprising:
    calibrating a meter and obtaining characterization data from the meter;
    digitally storing the characterization data for the meter in a data tag, the data tag comprising an optically-scanned code;
    attaching the data tag to the meter;
    receiving measurements from the meter and the characterization data for the meter from a portable reader configured to read the optically-scanned code of the data tag and provide the characterization data to the meter; and
    processing the received measurements from the meter and calibrating the received measurements using the characterization data.

12. The method of claim 11, wherein calibrating the meter comprises characterizing the meter over an operating range with at least one of different K-factors at corresponding different Reynolds numbers.

13. The method of claim 11, further comprising measuring fluid flow with the meter.

14. The method of claim 11, wherein processing and calibrating the received measurements includes calculating a total amount of fluid flow measured by the meter.

15. The method of claim 11, wherein receiving the characterization data comprises receiving the characterization data by electronics also receiving the measurements from the meter.

16. The method of claim 11, further comprising writing data to the data tag with the portable reader, wherein the portable reader comprises a RFID reader and the data tag comprises an RFID tag.

17. The method of claim 11, further comprising:
loading the characterization data into a database; and
indicating the meter has operated outside of an operating parameter.

18. The method of claim 11, further comprising:
confirming the data tag includes the characterization data for the meter; and
attaching the data tag to the meter.

19. The method of claim 11, wherein the optically scanned code comprises a quick response (QR) code.

20. A meter for use with a data tag, the meter comprising a processor configured to:
calibrate the meter and obtaining characterization data from the meter;
digitally store the characterization data for the meter in the data tag, the data tag comprising an optically-scanned code;
attach the data tag to the meter;
receive measurements from the meter and the characterization data for the meter from a portable reader configured to read the optically-scanned code of the data tag and provide the characterization data to the meter; and
process the received measurements from the meter and calibrating the received measurements using the characterization data.

* * * * *